(12) United States Patent
Roberts et al.

(10) Patent No.: US 12,491,465 B2
(45) Date of Patent: Dec. 9, 2025

(54) APPARATUS AND PROCESS FOR REMOVAL OF HEAVY HYDROCARBONS FROM A FEED GAS

(71) Applicant: Honeywell LNG LLC, Wilmington, DE (US)

(72) Inventors: Mark Julian Roberts, Whitehall, PA (US); Justin David Bukowski, Hamburg, PA (US); Christopher Michael Ott, Macungie, PA (US)

(73) Assignee: HONEYWELL LNG LLC, Wilmington, DE (US)

( * ) Notice: Subject to any disclaimer, the term of this patent is extended or adjusted under 35 U.S.C. 154(b) by 423 days.

(21) Appl. No.: 18/101,211

(22) Filed: Jan. 25, 2023

(65) Prior Publication Data

US 2024/0246022 A1 Jul. 25, 2024

(51) Int. Cl.
*B01D 53/04* (2006.01)

(52) U.S. Cl.
CPC .... *B01D 53/0438* (2013.01); *B01D 2253/102* (2013.01); *B01D 2256/245* (2013.01); *B01D 2257/702* (2013.01); *B01D 2259/416* (2013.01)

(58) Field of Classification Search
CPC .............. B01D 53/0438; B01D 53/04; B01D 2253/102; B01D 2256/245; B01D 2257/702; B01D 2259/416
USPC ......... 95/115, 143, 273; 96/134; 55/DIG. 25
See application file for complete search history.

(56) References Cited

U.S. PATENT DOCUMENTS

| | | | | |
|---|---|---|---|---|
| 3,708,965 A | * | 1/1973 | Domnick | B01D 46/2403 55/498 |
| 3,955,945 A | * | 5/1976 | Bauer | F04B 39/16 55/319 |
| 4,231,768 A | * | 11/1980 | Seibert | B01D 39/14 210/DIG. 5 |
| 4,692,175 A | * | 9/1987 | Frantz | B01D 46/0031 55/486 |
| 4,759,782 A | * | 7/1988 | Miller | B01D 46/2411 210/DIG. 5 |
| 5,181,942 A | * | 1/1993 | Jain | B01D 53/04 95/122 |
| 5,277,154 A | * | 1/1994 | McDowell | F01M 13/04 123/573 |
| 11,499,775 B2 | | 11/2022 | Roberts et al. | |
| 2011/0315012 A1 | * | 12/2011 | Kuznicki | B01D 53/04 95/143 |

(Continued)

*Primary Examiner* — Frank M Lawrence, Jr.
(74) *Attorney, Agent, or Firm* — CANTOR COLBURN LLP (57) ABSTRACT

An apparatus and process for heavy hydrocarbon (e.g., oils that include ten or more carbons, C10+ hydrocarbons, etc.) removal from a natural gas feed (e.g., a feed comprised of methane and impurities such as water and heavy hydrocarbons) can include utilization of one or more coalescing filters to provide adsorption of atomized (e.g., liquid) heavy hydrocarbons that can be present within the feed prior to the feed being fed to one or more adsorbers for adsorption of heavy hydrocarbon vapor via activated carbon beds within those adsorbers. Embodiments can be provided so that the size of downstream activated carbon bed adsorbers can be significantly reduced while also allowing such beds to have a longer life before needing to be replaced.

20 Claims, 3 Drawing Sheets

(56) References Cited

U.S. PATENT DOCUMENTS

| | | | |
|---|---|---|---|
| 2013/0192299 A1* | 8/2013 | Dolan | C10G 5/02 |
| | | | 62/636 |
| 2015/0290575 A1* | 10/2015 | Rothermel | B01D 53/0423 |
| | | | 703/1 |
| 2016/0216030 A1 | 7/2016 | Truong et al. | |
| 2018/0280866 A1* | 10/2018 | Hasegawa | B01D 53/1475 |
| 2019/0184329 A1* | 6/2019 | Sharma | B01D 53/04 |
| 2019/0299151 A1* | 10/2019 | Griffiths | B01D 53/0423 |
| 2019/0388828 A1* | 12/2019 | Doong | B01D 3/143 |
| 2020/0002633 A1* | 1/2020 | Doong | C10L 3/106 |
| 2022/0178609 A1 | 6/2022 | Horne et al. | |
| 2022/0403273 A1* | 12/2022 | Dolan | B01D 53/047 |
| 2024/0352366 A1* | 10/2024 | Loeb | C10L 3/104 |

\* cited by examiner

APPARATUS AND PROCESS FOR REMOVAL OF HEAVY HYDROCARBONS FROM A FEED GAS

FIELD

The present innovation relates to processes and systems for treating gas feeds that comprise methane (e.g., natural gas) to remove impurities from the feed that can be present in a liquid form and vapor form (e.g., remove atomized heavy hydrocarbons having 10 or more carbons within the gas feed, etc.).

BACKGROUND

Liquified natural gas (LNG) is a cooled natural gas that is cooled and liquified, so it is in a liquid state. The LNG includes methane ($CH_4$). Example of systems and processes involving LNG can be appreciated from U.S. Patent Application Publication Nos. 2022/0178609 and 2016/0216030 and U.S. Pat. No. 11,499,775.

SUMMARY

Many cryogenic natural gas liquid (NGL) recovery plants and LNG plants can utilize natural gas fed from pipelines. Such plants can remove some hydrocarbon components that would freeze in the cryogenic liquefaction process and recover ethane, propane, and butanes (e.g., for refrigerant make up). However, such plants often fail to account for very heavy hydrocarbons that can be present in the natural gas feeds.

The presence of the heavy hydrocarbons in such pipeline feed gases can be from various sources. For instance, compressor lubrication oils can be introduced to a feed stream at natural gas gathering systems or interstate transmission systems for transmission of the natural gas through the pipelines. These oils can be very viscous as the natural gas undergoes cooling, which can plug or foul heat exchangers associated with NGL recovery or natural gas liquefaction. The heavy hydrocarbons can also be present in a feed gas in both liquid and vapor form (e.g., be present as atomized liquid droplets entrained within the feed gas as well as in vapor form within the feed gas).

The amount of heavy hydrocarbons present in a feed gas can be highly variable. This can be particularly true for feed gas sources provided by one or more natural gas pipelines because the pipeline networks can be fed from various different sources. The unknown quantity or concentration of heavy hydrocarbons (and whether such an impurity may be present as a vapor, a liquid, or both a vapor and a liquid) can make it hard to detect that such an impurity may cause any type of processing issue since these pipeline networks are fed by many sources and a feed gas may only occasionally be obtained that creates an above-mentioned plugging issue or other type of processing issue.

Removal of heavy hydrocarbons from a gas feed to be fed to a natural gas liquification system for forming liquified natural gas (LNG) or for NGL recovery can create significant capital and operational costs. For example, removal of impurities like heavy hydrocarbons via adsorbers having beds of adsorbent material (e.g., activated carbon material) can require large adsorbers with large beds of material. The adsorbent material within the adsorbers may also need to be replaced often, which can contribute to higher operational costs, a use of a significant amount of adsorbent material, and also contribute to a feed processing shut down that can detrimentally affect operations due to the need to replace the adsorbent material within the adsorbers.

An improved process and treatment for removal of heavy hydrocarbons can address a number of shortcomings for improving operational performance while also reducing the amount of waste material that may be generated and reducing the frequency at which adsorbent material beds may need to be replaced. For instance, some embodiments of the apparatus and/or process of the present invention can permit removal of heavy hydrocarbons from a feed gas while also permitting much smaller sized adsorbers with one or more beds of adsorbent material to be utilized in treating a feed including natural gas so a treated feed gas can be formed for feeding to an LNG liquefaction system for liquefying the treated feed gas. Even though such adsorbers may be smaller, the embodiments can permit the life of the adsorbent material to be increased significantly, so that adsorbent bed replacement can occur less often as well.

Embodiments of the process and apparatus of the present invention can be configured so that a treated feed gas can have a more reliable and consistent concentration of heavy hydrocarbons after having passed through one or more coalescing filter devices. This can help permit all the adsorbers of the pretreatment system downstream of one or more coalescing filter devices to have a substantially smaller size with substantially smaller adsorbent beds without incurring a significant risk of having heavy hydrocarbons unexpectedly breakthrough the adsorbers and into the treated feed at unacceptable concentration. And (as noted above) even though such adsorbers may be smaller, embodiments can permit the life of the adsorbent material to be increased significantly, so that adsorbent bed replacement can occur less often as well.

In a first aspect, an apparatus for removal of heavy hydrocarbon impurities from a feed comprising methane gas is provided. The apparatus of the first aspect can include a coalescing filter device having at least one coalescing filter that has a plurality of coalescing filter elements to remove liquid heavy hydrocarbons from within the feed. The liquid heavy hydrocarbons can be separated so that the separated liquid heavy hydrocarbons can be output from the coalescing filter device.

The apparatus can also include an adsorption system positioned downstream of the coalescing filter device to receive a coalescing filter device treated feed output flow output from the coalescing filter device. The adsorption system can include a first adsorber. The first adsorber can have a first bed of adsorbent material within a first vessel of the first adsorber. The first adsorber can be positioned to receive the coalescing filter device treated feed output flow output from the coalescing filter device so that the coalescing filter device treated feed output flow output from the coalescing filter device is passed through the first adsorber to contact the adsorbent material of the first bed of adsorbent material for removal of heavy hydrocarbons to output a treated feed gas.

In a second aspect, the heavy hydrocarbons can be hydrocarbons that have 10 or more carbon atoms or include at least one compressor lubricant oil. The heavy hydrocarbons can be present in gas and liquid form within the feed, which can include methane gas. In some implementations, the feed can also include water. The water content of the feed can be less than or equal to 2 ppmw water (e.g., between 2 ppmw water and 0 ppmw water).

In a third aspect, the apparatus can include a cooling device positioned upstream of the coalescing filter device to cool the feed to a pre-selected coalescing filter device feed temperature before the feed is fed to the coalescing filter device. In some implementations, the pre-selected coalescing filter device feed temperature can be a temperature that is between 25° C. and −20° C., a temperature that is between 5° C. and −10° C. or a temperature that is between 0° C. and −10° C.

In a fourth aspect, the apparatus can include a heat exchanger positioned downstream of the adsorption system to cool the treated feed gas outputtable from the adsorption system to output a cooled treated feed gas. A cooling device can be positioned upstream of the coalescing filter device to receive the cooled treated feed gas from the heat exchanger to cool the feed to a pre-selected coalescing filter device feed temperature before the feed is fed to the coalescing filter device (e.g, a temperature that is between 25° C. and −20° C., a temperature that is between 5° C. and −10° C. or a temperature that is between 0° C. and −10° C., etc.).

In a fifth aspect, the apparatus can include a heat exchanger positioned downstream of the adsorption system to cool the treated feed gas outputtable from the adsorption system. The heat exchanger can be a chiller (e.g., a mechanical chiller, an adsorption chiller, another type of chiller, etc.) or another type of heat exchanger.

In a sixth aspect, the apparatus can include a heat exchanger positioned downstream of the adsorption system to cool the treated feed gas outputtable from the adsorption system to a temperature within a pre-selected liquefaction device feed temperature range or a pre-selected cryogenic processing feed temperature range for cryogenic processing at a temperature that is at or below −40° C.

In a seventh aspect, the apparatus can include a cooling device positioned upstream of the coalescing filter device to cool the feed to a pre-selected coalescing filter device feed temperature before the feed is fed to the coalescing filter device. In such implementations, the cooling device can include an expansion device, a turbine, or a valve or the cooling device can be the expansion device, turbine, or valve.

In an eighth aspect, the apparatus can include a cooling device positioned upstream of the coalescing filter device to cool the feed to a pre-selected coalescing filter device feed temperature before the feed is fed to the coalescing filter device. The cooling device in such implementations can include a heat exchanger, a gas expander natural gas liquid (NGL) recovery unit or a natural gas liquefaction unit or the cooling device can be the heat exchanger, a component of the gas expander NGL recovery unit, or a component of the natural gas liquefaction unit.

In a ninth aspect, the apparatus can be configured for utilization with a feed that has a water content of less than 2 ppmw water and is at least 70 volume percent (vol %) methane. For example, the water content of the feed can be between 2 ppmw water and 0 ppmw water and the methane concentration of the feed can be between 70 vol % and 99.9 vol % methane.

In a tenth aspect, the apparatus can be configured for processing a feed that can be providable via at least one natural gas pipeline. The natural gas pipeline can be part of a network for natural gas transmission that includes various different sources of natural gas, gathering systems, and related natural gas transmission network elements. Such a feed can have a variable heavy hydrocarbon concentration with significant ranges in some embodiments.

In an eleventh aspect, a process for removal of heavy hydrocarbons from a feed comprising methane is provided. The process can include separating liquid heavy hydrocarbons from the feed via a coalescing filter device to output a coalescing filter device treated feed output flow and passing the coalescing filter device treated feed output flow through at least one bed of adsorbent material of at least one adsorber of an adsorption system for outputting a treated feed gas. Embodiments of the apparatus discussed herein can be configured to utilize an embodiment of this process.

For example, the adsorbent material can include activated carbon and the feed can be at least 70 vol % methane gas, include heavy hydrocarbon impurities therein, and a water content of less than 2 ppmw water.

In a thirteenth aspect, the process can be implemented so that the process also includes cooling the feed to a pre-selected coalescing filter device feed temperature before the feed is fed to the coalescing filter device. As discussed above, the pre-selected coalescing filter device feed temperature can be temperature that is between 25° C. and −20° C., a temperature that is between 5° C. and −10° C., a temperature that is between 0° C. and −10° C., or another suitable temperature.

In a fourteenth aspect, the process can include cooling the treated feed gas output from the adsorption system. For example, in one such implementation, the process can include cooling the treated feed gas output from the adsorption system to output a cooled treated feed gas, passing the feed through a cooling device to cool the feed to a pre-selected coalescing filter device feed temperature before the feed is fed to the coalescing filter device, and feeding the cooled treated feed gas to the cooling device to provide a cooling medium for the cooling of the feed to the pre-selected coalescing filter device feed temperature. Other implementations may utilize a different type of cooling arrangement for cooling of the treated feed gas. The cooling of the treated feed gas can be provided via a chiller or a heat exchanger. For instance, the cooling can be provided via a mechanical chiller, an absorption chiller, or other type of heat exchanger.

In a fifteenth aspect, the process can include feeding the treated feed gas output from the adsorption system to a liquefaction device for liquefaction to form a liquid natural gas (LNG) product or a cryogenic processing device for processing the treated feed gas at a temperature that is less than or equal to −40° C. For example, some embodiments can also include processing the treated feed gas at a temperature that is less than −40° C. to cryogenically process the treated feed gas.

In a sixteenth aspect, the process can include cooling the feed to a pre-selected coalescing filter device feed temperature before the feed is fed to the coalescing filter device. The pre-selected coalescing filter device feed temperature can be a temperature that is between 25° C. and −20° C., for example. The process can also include cooling the treated feed gas output from the adsorption system to a temperature within a pre-selected liquefaction device feed temperature range or a pre-selected cryogenic processing feed temperature range for cryogenic processing at a temperature that is less than or equal to −40° C.

In yet other aspects, an apparatus for removal of heavy hydrocarbon impurities from a feed comprising methane gas can include a coalescing filter device positionable to receive the feed. The coalescing filter device can have at least one coalescing filter that has a plurality of coalescing filter elements to remove liquid heavy hydrocarbons from within the feed. The liquid heavy hydrocarbons can be separatable from the feed for being outputtable from the coalescing filter device (e.g., via at least one drain, etc.). The coalescing filter device can be connectable to an adsorption system positioned downstream of the coalescing filter device to feed a coalescing filter device treated feed output flow output from the coalescing filter device to the adsorption system so that the coalescing filter device treated feed output flow output from the coalescing filter device is passable through at least one first adsorber of the adsorption system to contact adsorbent material of a first bed of adsorbent material for removal of heavy hydrocarbons to output a treated feed gas. In some embodiments, the apparatus can be positioned and arranged so that the treated feed gas can be utilized for NGL recover, natural gas liquefaction, or in cryogenic processing. Embodiments of the apparatus can be configured to implement an embodiment of the process for removal of heavy hydrocarbons from a feed comprising methane discussed herein.

It should be appreciated that embodiments of the process and apparatus can utilize various conduit arrangements and process control elements. The embodiments may utilize sensors (e.g., pressure sensors, temperature sensors, flow rate sensors, concentration sensors, etc.), controllers, valves, piping, and other process control elements. Some embodiments can utilize an automated process control system and/or a distributed control system (DCS), for example. Various different conduit arrangements and process control systems can be utilized to meet a particular set of design criteria.

Other details, objects, and advantages of the process of the present invention for treating gas feeds that comprise methane (e.g., natural gas) to remove impurities from the feed that can be present in a liquid form and a vapor form, an apparatus for treating gas feeds that comprise methane to remove impurities from the feed gas, a system for treating gas feeds that comprise methane to remove impurities from the feed that can be present in a liquid form and a vapor form, and methods of making and using the same will become apparent as the following description of certain exemplary embodiments thereof proceeds.

BRIEF DESCRIPTION OF THE DRAWINGS

Exemplary embodiments of processes for treating gas feeds that comprise methane to remove impurities from the feed that can be present in a liquid form as well as a vapor form, apparatuses for treating gas feeds that comprise methane to remove impurities from the feed gas, and systems for treating gas feeds that comprise methane to remove impurities from the feed gas, and methods of making and using the same are shown in the drawings included herewith. It should be understood that like reference characters used in the drawings may identify like components.

FIG. 1 also illustrates a first exemplary embodiment of a process for treating the gas feed that comprises methane to remove impurities from the feed gas. The impurities present in the feed gas to be treated can include heavy hydrocarbons that are present in liquid form as atomized droplets of liquid entrained within the gas feed as well as also being present in vapor form.

FIG. 2 also illustrates a second exemplary embodiment of a process for treating the gas feed that comprises methane to remove impurities from the feed gas. The impurities present in the feed gas to be treated can include heavy hydrocarbons that are present in liquid form as atomized droplets of liquid entrained within the gas feed as well as also being present in vapor form.

DETAILED DESCRIPTION

Figure 1:
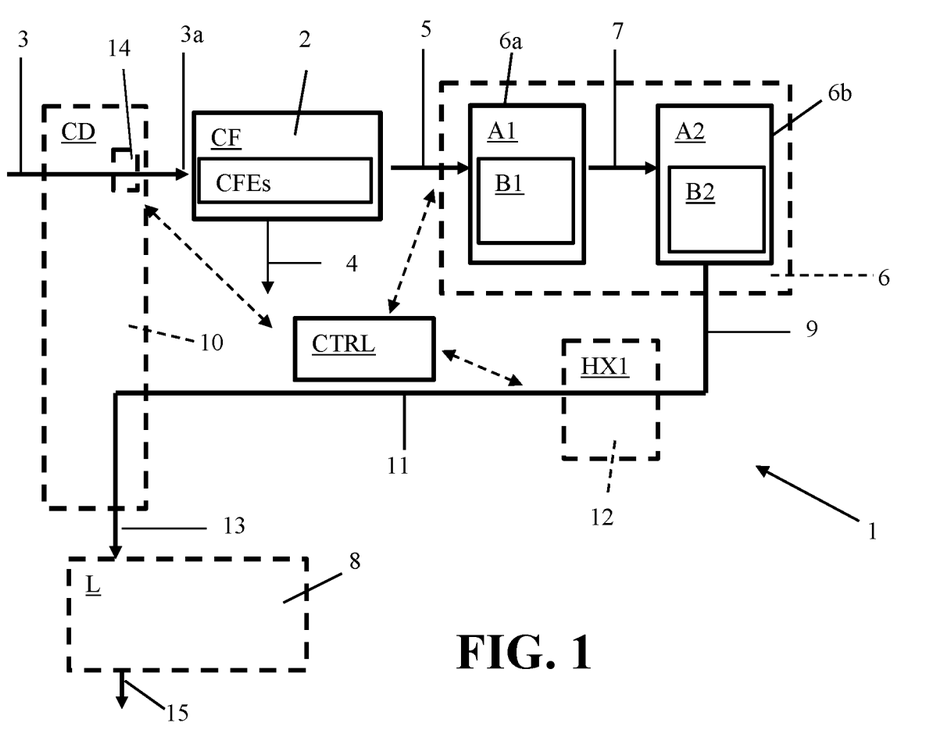
FIG. 1 is a block diagram of a first exemplary embodiment of an apparatus for treating a gas feed that comprises methane to remove impurities from the feed gas.
Figure 2:
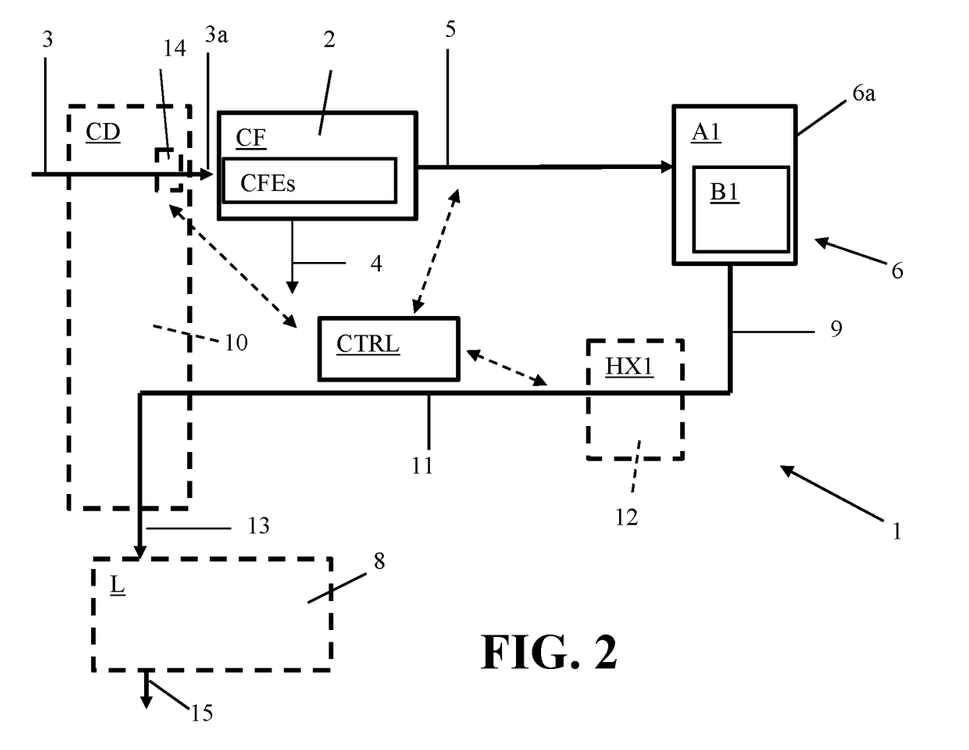
FIG. 2 is a block diagram of a second exemplary embodiment of an apparatus for treating a gas feed that comprises methane to remove impurities from the feed gas.

FIGS. 1 and 2 illustrate exemplary embodiments of apparatus 1 for treating one or more feeds that comprise methane to remove impurities from the feed that can be present in vapor form and in liquid form. These exemplary embodiments of the apparatus 1 can utilize an exemplary embodiment of a process for treating one or more gas feeds that comprise methane to remove impurities from the feed that can be present in vapor form and in liquid form. Examples of such processes can be appreciated from FIGS. 1-3.

The feed 3 that can be fed to the apparatus 1 can include methane ($CH_4$) gas as well as impurities. The feed 3 can be a feed obtained from a natural gas pipeline or be an outlet of a natural gas pipeline that is connected to the apparatus 1. The pipeline that can provide the feed 3 can be a common carrier pipeline that provides natural gas from multiple different methane sources or providers via a natural gas pipeline network, for example. For instance, the pipeline 3 that provides the feed 3 can be a pipeline connected to natural gas gathering systems or interstate transmission systems for transmission of the natural gas through the pipeline.

The feed 3 can have a pre-selected methane concentration. For instance, the pre-selected methane concentration of the feed 3 can be between 80 volume percent (vol %) methane and 90 vol % methane, between 70 vol % methane and 99.9 vol % methane, or other suitable methane concentration.

The impurities within the gas feed 3 can include or be one or more heavy hydrocarbons. Each of the heavy hydrocarbons can be hydrocarbons that have ten or more carbons (e.g., C10+ hydrocarbons). Examples of such heavy hydrocarbons can be lubricating oils used in compressors of a pipeline transmission network (e.g., compressors at different natural gas gathering systems, etc.) that may compress natural gas flows that can be transmitted via the pipeline for providing the feed 3, for example.

The one or more heavy hydrocarbons present within the feed gas 3 can be in liquid form as well as in vapor form. For instance, some of heavy hydrocarbons present in the feed 3 can include entrained liquid droplets comprising at least one heavy hydrocarbon (e.g., atomized liquid within the feed gas that comprises one or more heavy hydrocarbons). Another portion of heavy hydrocarbons present in the feed gas 3 can be in vapor form (e.g., some portion of the one or more heavy hydrocarbons can be in a gas phase while another portion is in a liquid phase). The impurities such as the water and the heavy hydrocarbons can be included within the feed, which can be mostly comprised of methane.

The feed 3 can undergo processing to remove various components prior to being fed to the apparatus 1. For example, the gas feed can be passed through carbon dioxide and sulfur removal units that are upstream of the apparatus 1. The feed can also be passed through a dehydrator upstream of the apparatus 1 so that the water content within the feed 3 fed to the apparatus 1 is within a pre-specified water content. In some embodiments, the pre-specified water content for the feed 3 can be a water content that is between 0 ppmw and 2 ppmw, be a value that is greater than 0 ppmw water and less than or equal to 1 ppmw water, or be a value that is between 0 ppmw and 2 ppmw (e.g., up to 1 ppmw water, up to 2 ppmw water, up to 1.5 ppmw water, etc.). It is also contemplated that other embodiments can utilize a different water content value to meet a particular set of design criteria.

The apparatus 1 can be configured to treat the feed 3 to remove a substantial portion of heavy hydrocarbons from the feed before the feed is fed to an adsorption system 6, which can include one or more adsorbers (e.g., first adsorber 6a and/or second adsorber 6b, etc.). Embodiments can include a coalescing filter device 2 that has at least one coalescing filter CF that receives the feed 3 and passes that feed 3 through coalescing filter elements CFEs of the coalescing filter CF. The coalescing filter elements CFEs can be positioned within a vessel of the coalescing filter CF so that the gas feed 3 is passed through those elements while liquid droplets of the heavy hydrocarbons entrained within the gas feed 3 are contacted by the coalescing filter elements CFEs to separate the liquid droplets from the gas feed 3 and prevent those liquid droplets from passing out of the coalescing filter CF. In some embodiments, the coalescing filter elements CFEs can be mesh structures positioned in a coalescing filter CF vessel for contacting the liquid droplets within the gas feed to separate the liquid droplets from the gas of the gas feed.

In some embodiments, the coalescing filter device 2 can include a single coalescing filter CF. Other embodiments may utilize multiple coalescing filters CF. The coalescing filters CF in such embodiments can be arranged to operate in parallel and/or in series. In some arrangements, there can be sets of coalescing filters CF where a first set of coalescing filters is arranged in series and operates in parallel with a second set of coalescing filters arranged in series.

The coalescing filter device 2 can output a coalescing filter device treated feed output flow 5 that includes the gaseous methane of the feed 3 without liquid heavy hydrocarbon material entrained within the gas or essentially no such liquid heavy hydrocarbon material entrained within the treated feed gas (e.g., at least 90% of the liquid heavy hydrocarbon material entrained within the feed can be removed via the coalescing filter device 2, between 95% and 100% of the liquid heavy hydrocarbon material entrained within the feed 3 can be removed via the coalescing filter device 2, etc.).

The coalescing filter device 2 can also output a liquid heavy hydrocarbon flow 4 that is comprised of the heavy hydrocarbon liquid separated from the gas feed. The liquid heavy hydrocarbon flow 4 can be output via a drain or other outlet of each coalescing filter CF of the coalescing filter device 2. The liquid heavy hydrocarbon flow 4 can be collected for treatment and/or disposal, can be used as a fuel source for a plant process connected to the apparatus 1, or can be processed in another suitable fashion.

The coalescing filter device treated feed output flow 5 can be fed to at least one adsorber of an adsorption system 6 positioned downstream of the coalescing filter device 2. The adsorption system 6 can include one or more adsorbers configured to remove gaseous heavy hydrocarbons (e.g., heavy hydrocarbons that may be present in vapor form within the feed) prior to outputting the feed gas as a treated feed gas 9 that can be fed to a cryogenic processing device (e.g., a liquefaction device 8 or a cooling device 10 that includes a liquefaction system for undergoing liquefaction to form liquid natural gas (LNG), etc.).

The adsorber(s) of the adsorption system 6 can also be configured to remove any remaining liquid heavy hydrocarbons (e.g., heavy hydrocarbons that may be present in liquid form within the feed that remained in the feed after being output from the coalescing filter device 2) prior to outputting the feed gas as a treated feed gas 9 that can be fed to a liquefaction device 8 or a cooling device 10 that includes a liquefaction system for undergoing liquefaction to form liquid natural gas (LNG). The formed LNG can be output as a product stream 15 for feeding to at least one storage device and/or transport vehicle for transport of the LNG product.

The feed 3 can be treated via the coalescing filter device 2 and adsorption system 6 so that the treated feed gas 9 has no heavy hydrocarbons or almost no heavy hydrocarbons therein so that the heavy hydrocarbons cannot foul or plug heat exchangers or other equipment that may be used in downstream cryogenic processing in which the feed temperature will be reduced to $-40°$ C. or below $-40°$ C. (e.g. less than $-50°$ C., less than $-60°$ C., etc.). Examples of downstream cryogenic processing that the treated gas 9 can be subject to include helium recovery, natural gas liquefaction, nitrogen rejection, or NGL recovery. In such processing, the treated feed gas 9 can be cooled to a temperature of less than or equal to $-40°$ C., or less than or equal to $-50°$ C., or less than or equal to $-60°$ C.

As may best be appreciated from FIG. 1, the adsorption system 6 can include a first adsorber 6a and a second adsorber 6b. The first adsorber 6a can include a first vessel A1 that has at least one first bed 1 of adsorbent material retained therein. The adsorbent material of the at least one first bed 1 can be comprised of activated carbon or other suitable adsorbent material. The first adsorber 6a can be configured so that the adsorbent material of the at least one first bed 1 of adsorbent material contacts fluid fed therein to remove heavy hydrocarbons from within that fluid (e.g., remove gaseous heavy hydrocarbons and/or any liquid heavy hydrocarbons from within the fluid that remained in the feed after it was output from the coalescing filter device 2).

The second adsorber 6b can be positioned downstream of the first adsorber 6a to receive the treated feed 7 output from the first adsorber 6a to provide further heavy hydrocarbon removal via further adsorption in the second adsorber 6b. The second adsorber 6b can include a second vessel A2 that retains at least one second bed B2 of adsorbent material. As with the first adsorber 6a, the adsorbent material of the at least one second bed B2 can be comprised of activated carbon or other suitable adsorbent material. The second adsorber 6b can be configured so that the adsorbent material of the at least one second bed B2 of adsorbent material contacts fluid fed therein to remove heavy hydrocarbons from within that fluid (e.g., remove gaseous heavy hydrocarbons and/or any liquid heavy hydrocarbons from within the fluid that remained in the feed after it was output from the coalescing filter device 2).

The conduit arrangement for transporting the treated feed from the coalescing filter device 2 to the adsorption system 6 can be configured to permit the flow of treated gas to be switched. For example, for a first operational cycle, the coalescing filter device treated feed output flow 5 can be fed to the first adsorber 6a of the adsorption system 6 positioned downstream of the coalescing filter device 2. After the adsorbent material of the first bed 1 becomes saturated with heavy hydrocarbons indicated by a breakthrough of heavy hydrocarbons in the treated feed 7 output from the first adsorber 6a, valve positions of the conduit arrangement can be adjusted to initiate a second operational cycle in which the coalescing filter device treated feed output flow 5 can be fed to the second adsorber 6b and either bypass the first adsorber 6a or be subsequently passed through the first adsorber 6a after the gas is treated via the second adsorber 6a. The first bed 1 of adsorbent material can be removed and replaced with fresh adsorbent material during the second operational cycle. The valves of the conduit arrangement can then be adjusted back to the first operational cycle arrangement so that the coalescing filter device treated feed output flow 5 can again be fed to the first adsorber 6a of the adsorption system 6 before it is subsequently fed to the second adsorber 6b.

In some implementations, such an adjustment in the operational cycle back to the first operational cycle can occur after a breakthrough of heavy hydrocarbons is detected in the treated feed output from the second adsorber 6b while the adsorption system is operated in the second operational cycle. In such embodiments, the second bed B2 of adsorbent material can be removed and replenished with fresh material when the adsorption system operates in the first operational cycle.

It should be appreciated that the first adsorber 6a a of the adsorption system 6 of the embodiment of FIG. 1 can be a single adsorber or can include multiple adsorbers that operate in parallel. Also, the second adsorber 6b of the adsorption system 6 of the embodiment of FIG. 1 can be a single adsorber or can include multiple adsorbers that operate in parallel.

As may best be appreciated from the embodiment of FIG. 2, some embodiments can utilize an adsorption system 6 that may only include a first adsorber 6a or a first set of adsorbers 6a that may operate in parallel. In such embodiments, the treated feed gas 9 can be monitored so that when a heavy hydrocarbon breakthrough condition is detected, a new first adsorber 6a is brought on-line to replace the old first adsorber 6a and the adsorbent material in the old first adsorber 6a can be removed and replaced with fresh material or undergo regeneration for subsequent use after the adsorbent material of the new first adsorber is saturated with heavy hydrocarbons. The cycling of on-line and off-line adsorbers can be repeated multiple times during the course of operations as needed.

It should be appreciated that the first adsorber 6a a of the adsorption system 6 of the embodiment of FIG. 2 can each be a single adsorber or can include multiple adsorbers that operate in parallel or in series (e.g., is at least one first adsorber 6a).

The one or more adsorbers of the adsorption system 6 can have adsorbent beds that are oriented with their inlet at or adjacent a bottom of their vessel and an outlet at or adjacent their top of their vessel for an upflow arrangement of gas through the adsorber(s). Alternatively, the inlet for each adsorber can be at or adjacent a top and the outlet can be at or adjacent a bottom for a downflow arrangement of gas passed through the adsorber(s). Other flow orientations for the adsorber(s) of the adsorption system 6 can also be utilized.

In some embodiments the apparatus 1 can utilize a cooling device (CD) 10. For example, the cooling device 10 can include an economizer, a turbine, a gas expansion device, a heat exchanger and/or a valve 14 for cooling the feed 3 prior to the feed being fed to the coalescing filter device 2. As another example, the cooling device 10 can be a heat exchanger, the expansion device, the valve 14, be part of a gas expander natural gas liquid (NGL) recovery unit (e.g., an Ortloff Gas Subcooled Process unit or other type of suitable unit) or be a natural gas liquefaction unit (e.g., a liquefier for a LNG producing facility). In some implementations, the cooling device 10 can be configured to integrate the apparatus 1 into the LNG facility or NGL recovery unit (e.g., in embodiments where the cooling device 10 is a part of the LNG facility or NGL recovery unit).

The cooling device 10 can be arranged to cool the feed 3 to a pre-selected coalescing filter device feed temperature. For example, the pre-selected coalescing filter device feed temperature can be a temperature in the range of 25° C. to −20° C., a temperature between 20° C. and 0° C., a temperature between 5° C. and −10° C., or a temperature between 0° C. and −10° C. (e.g., −5° C., between −2° C. and −7° C., etc.). The pre-selected coalescing filter device feed temperature can be selected to facilitate condensation of at least some, if not all, of the heavy hydrocarbon vapor within the feed so that the condensed heavy hydrocarbon liquid can be removed via the coalescing filter device 2 and less heavy hydrocarbon content in vapor form is included in the feed for removal via the adsorption system 6. In some implementations, the pre-selected coalescing filter device feed temperature can be selected so that at least 25% to up to 100% of the heavy hydrocarbon vapor within the feed is condensed into a liquid before it is fed to the coalescing filter device 2. Of course, other implementations may utilize a different pre-selected coalescing filter device feed temperature that may provide less condensation of the heavy hydrocarbon vapor within the feed as well.

As discussed above, the cooling device 10 can be an expansion device (e.g., an orifice within a conduit, a turbine, etc.) or a valve 14 or include a valve 14, which can be a Joule-Thomson valve, for example. The valve 14 or other type of expansion device (e.g., turbine, orifice, etc.) can be configured to provide cooling by providing a pressure drop for the feed 3, for example. In some embodiments, the cooling device 10 may only include the valve 14. In other embodiments, the cooling device 10 may only include a heat exchanger, only include an expansion device (e.g., a turbine or a valve, etc.) or can include a combination of a heat exchanger and the valve 14 and/or expansion device. In yet other embodiments, the cooling device can include the above noted integration with a liquefier or NGL recovery unit.

For example, a feed 3 that is at a suitable temperature and pressure may only need a valve 14 to provide a sufficient pressure drop for providing cooling to a pre-selected coalescing filter device feed temperature. As one non-limiting example, for a feed that is at 38° C. and 50 bar absolute (bara), chilling of the feed 3 to 5° C. can be provided with a 3-4 bara pressure drop via the valve 14 so the feed 3a at a pre-selected coalescing filter device feed temperature can be fed to the coalescing filter device 2. Other feed temperature and pressures as well as other design criteria may indicate that the heat exchanger, combination of a heat exchanger and valve 14, or other suitable arrangement can be used alternatively as discussed herein and as can be appreciated from FIGS. 1 and 2.

As yet another example, the cooling device 10 can be or include an expansion device (e.g., a turbine) that is positioned to receive the feed to cool the feed via expansion of the feed for generation of work (e.g. rotation of a shaft to generate electricity, provide power to one or more mechanical process elements via the shaft rotation, etc.). As noted above, such a turbine can also be utilized in combination with a valve or in combination with a heat exchanger in some implementations of the cooling device 10.

The cooling of the feed to the pre-selected coalescing filter device feed temperature can help permit the sizing of the one or more adsorbers of the adsorption system 6 to be relatively small in size. This can be provided by the coalescing filter device 2 facilitating removal of the liquid heavy hydrocarbons from the feed so that a smaller amount of heavy hydrocarbon material passes to the adsorption system 6 for removal therein, for example. In addition to adsorber size reduction, this can also help further improve adsorbent material life to help minimize the need for new replacement adsorbent material. The reduction in adsorber size and reduction in adsorbent bed replacement frequency can help provide reduced capital and operational costs as well as improved operational efficiency and reduced downtimes.

In some arrangements, the cooling that can be provided by the cooling device 10 can be provided via cooling treated feed gas 9 output from the adsorption system 6 via a heat exchanger 12 (HX1) positioned downstream of the adsorption system 6. The cooled treated feed gas 11 that is cooled via the heat exchanger 12 and output from the heat exchanger 12 can be fed to the cooling device 10 as the cooling medium used in the cooling device 10 for pre-cooling the feed 3 via the cooling device 10 to cool the feed 3 to the pre-selected coalescing filter device feed temperature.

The heat exchanger 12 can be a chiller, for example. The cooling medium of the heat exchanger 12 for cooling the treated feed gas 9 can be propane or mixed refrigerant from a natural gas liquefaction unit, cold nitrogen gas, cold methane gas, a chilled water/glycol mixture, a hydrofluorocarbon refrigerant or any other suitable refrigerant. The heat exchanger 12 can be configured to cool the treated feed gas 9 to a pre-selected liquefaction device feed temperature range or below such a temperature so the cooled treated feed gas 11 can be fed to the cooling device 10 as a cooling medium to cool the feed 3 to the pre-selected coalescing filter device feed temperature. In such arrangements, the cooling device 10 can be configured as a heat exchanger or an economizer or can include a heat exchanger or economizer that uses the cooled treated feed gas 11 as a cooling medium for cooling the feed 3.

In other configurations, a different cooling medium may be used in the cooling device 10 instead of a cooled treated feed gas 11. In such configurations, the treated feed gas 9 can be fed to the cooling device 10 for cooling to the pre-selected liquefaction device feed temperature or other suitable temperature. Such cooling can be provided after the treated feed gas is cooled by the heat exchange 12 or instead of that treated feed gas 9 being cooled via such a heat exchanger 12.

Embodiments that may utilize a heat exchanger 12 to cool the treated feed gas 9 output from the adsorption system 6 may not use the valve 14 or other type of expansion device to provide cooling of the feed 3. This can help avoid a pressure drop that is provided by that valve and/or other type of expansion device, which can reduce the downstream power requirement for cryogenic processing of the treated feed gas 9, e.g., NGL removal and/or liquefaction, etc.

The heat exchanger 12, when utilized, can output a cooled treated feed gas 11 that can be fed to the cooling device 10 or to a liquefaction device 8. The cooled treated feed gas 11 can be further cooled by being passed through the cooling device 10 before it is fed to a liquefaction device 8 or undergoes liquefaction in embodiments where the cooling device 10 is a component of liquefier of an LNG facility or a gas expander NGL recovery unit, for example. In such situations where the cooling device 10 is a heat exchanger, the cooled treated gas 11 can be fed to a liquefaction device (L) 8 as a liquefaction device feed 13 that is at a cooled temperature within a pre-selected liquefaction device feed temperature range. This temperature can be any suitable temperature that can meet a pre-selected design criteria for liquefaction via the liquefaction device 8.

The heat exchanger 12 can be downstream of the adsorption system 6 and the coalescing filter device 2 so that it cools the treated feed gas 9 after it has been treated to remove heavy hydrocarbons from the feed 3. This can permit the cooling of the treated feed to occur so that the cooling occurs without any heavy hydrocarbons being present during the cooling provided by the heat exchanger 12. This can permit the heat exchanger 12 to cool the treated feed gas 9 to a cryogenic processing temperature that is less than or equal to −40° C., less than or equal to −50° C., less than or equal to −60° C. or other suitable temperature at or below −40° C. without fouling or plugging of the heat exchanger 12 occurring (as noted above, such fouling or plugging could otherwise occur due to heavy hydrocarbons that may be present in the feed 3 received from a pipeline).

Utilization of a heat exchanger 12 can be beneficial when the temperature of treated feed gas 9 is warmer than −40° C. for some implementations. For example, using a cold refrigerant at −20° C. or other suitable cooling temperature to cool the treated feed gas 9 to produce cooled treated feed gas 11 at 0° C. or other pre-selected temperature can allow that cooled, treated feed gas 11 to be utilized to cool feed gas 3 to a pre-selected coalescing device feed temperature (e.g., a temperature of 5° C. or other suitable temperature). The utilization of refrigerant that is cold (e.g. −30° C. or colder or −20° C. or colder, etc.) will not result in any fouling on the cold heat transfer surfaces of the heat exchanger 12 due to the coalescing filter device 2 and/or adsorption system 6 treating of the feed 3.

In contrast, if treatment of the feed 3 was not provided, fouling or plugging of a heat exchanger for cooling of feed 3 could occur due to the presence of heavy hydrocarbons that may be within the feed 3 because the heavy hydrocarbons could contact heat transfer surfaces that are in contact with cold refrigerant. For instance, the presence of heavy hydrocarbons within the feed 3 can result in plugging or fouling issues arising when the non-treated feed contacts heat transfer surfaces of a heat exchanger that are colder than 0° C. The positioning of the heat exchange 12 downstream of the adsorption system 6 and coalescing filter device 2 can avoid such plugging and fouling issues and permit the feed to be suitable for cryogenic processing (e.g., be processed at a temperature of less than or equal to −40° C.) and be pre-cooled to a more suitable feed temperature for such processing.

Embodiments of the apparatus 1 can also utilize at least one controller CTRL. The controller can be communicatively connected to concentration sensors, pressure sensors, temperature sensors, flow sensors, valves, and/or other elements to facilitate automated process control of the apparatus 1. For instance, in some embodiments, the controller CTRL can be a workstation that runs an automated process control software via a processor and can be communicatively connected to sensors and other elements to facilitate monitoring and control of the operation of the apparatus 1. In other situations, the controller CTRL can be part of a DCS system adapted to monitor and control operations of the apparatus 1. It should be appreciated that the controller CTRL is a computer device that includes a processor connected to a non-transitory computer readable medium (e.g., non-transitory memory) and at least one transceiver unit for communicative connections to other process control elements (e.g., sensors, detectors, valves, etc.).

Figure 3:
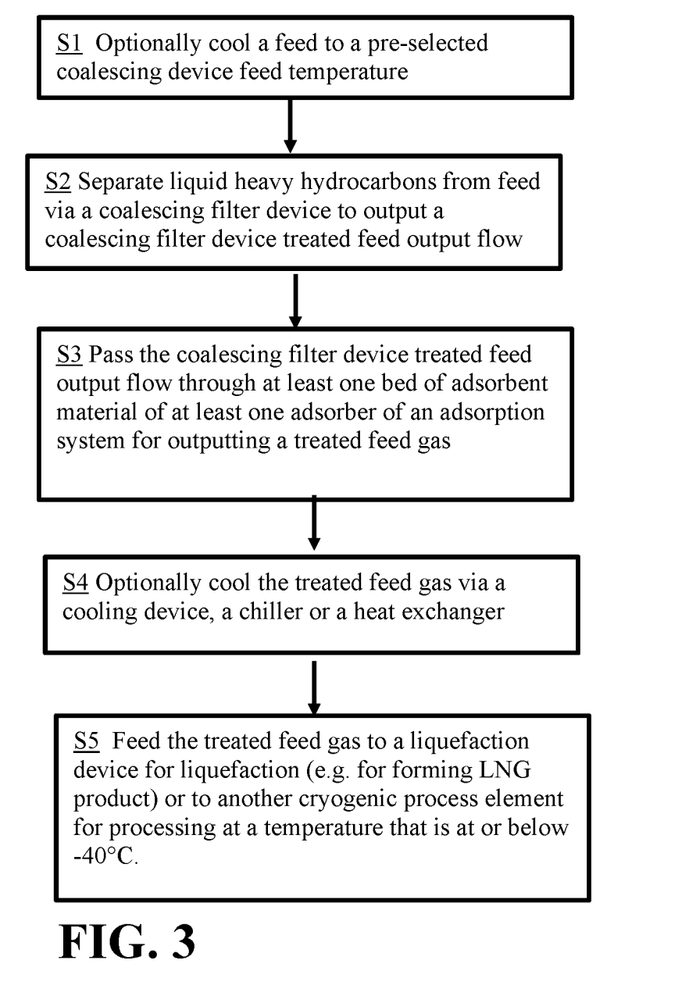
FIG. 3 is a flow chart illustrating an exemplary embodiment of a process for treating a gas feed that comprises methane to remove impurities from the feed gas. The embodiments of the apparatus 1 shown in FIGS. 1 and 2 can each be adapted to implement the exemplary embodiment of the process shown in FIG. 3.

Embodiments of the apparatus 1 (e.g., embodiments of FIGS. 1 and/or 2) can be configured to perform exemplary embodiments of a process for treating a feed gas comprising methane to remove heavy hydrocarbons (e.g., compressor lubricant oils and the like) from the feed gas. FIG. 3 illustrates an embodiment of such a process that includes optional steps S1 and S4 as well as steps S2, S3, and S5. It should be appreciated that other embodiments of the process can also use other steps or less steps (e.g., may not use step S1, may not use step S4, may not use steps S1 and S4, may use additional steps with or without step S1 and/or step S4, etc.).

As can be appreciated from the above, in a first optional step S1, a feed comprising methane as well as impurities (e.g., water, heavy hydrocarbons) can be fed to a cooling device 10 to cool the feed 3 to a pre-selected coalescing filter device feed temperature. Some embodiments of the process may omit this optional step as discussed above.

In a second step S2 (which can be a first step of the process if the optional step S1 is omitted), liquid heavy hydrocarbons (e.g., compressor lubricant oils, etc.) entrained within the feed can be separated from the feed via a coalescing filter device 2 to output a coalescing filter device treated feed output flow 5. The coalescing filter device 2 can include one or more coalescing filters CFs that include multiple coalescing filter elements CFEs positioned to separate the liquid heavy hydrocarbons from the feed as the feed is passed through the coalescing filter(s) of the coalescing filter device 2.

In a third step S3, the coalescing filter device treated feed output flow 5 can be passed through at least one bed of adsorbent material of at least one adsorber of an adsorption system 6 for outputting a treated feed gas 9. The adsorbent material can contact the fluid to remove heavy hydrocarbons from the fluid, for example. The adsorbent material may be activated carbon or can include activated carbon. The adsorbent material can also be another suitable adsorbent material.

In a fourth optional step S4, the treated feed gas 9 can be cooled via a heat exchanger or a chiller (e.g., heat exchanger HX1) or a cooling device 10 (which may also be used to optionally cool the feed before it is fed to the coalescing filter device 2). The cooled treated feed gas can then be fed to a cryogenic process for cryogenic processing that can occur at temperatures at or below −40° C. Examples of such cryogenic processing can include feeding the cooled treated feed gas 9 to a liquefaction device 8 for liquefaction (e.g., for forming an LNG product) in a fifth step S5. The liquefaction device 8 can be a liquefier of an LNG manufacturing facility, for example.

Other examples of cryogenic processing that can utilize the treated feed gas 9 can include use of the treated feed gas 9 in NGL recovery, helium recovery, or nitrogen rejection. Such use could be provided as an alternative fifth step S5 instead of feeding the treated feed gas to a liquefaction device 8 for liquefaction.

It should be appreciated embodiments of the process can also use other steps. For example, the process can also include adjusting a flow path for the coalescing filter device treated feed output flow 5 so the flow passes through different adsorbers of the adsorption system 6 as discussed above. As another example, the process can also include taking an adsorber of the adsorption system offline for replacement of the bed of adsorbent material or regeneration of that material and replacing that off-line adsorber with another adsorber. Valves can be adjusted for facilitating the changed operational cycle for use and non-use of the adsorbers to facilitate such an adjustment in operational cycle. Such an adjustment can be triggered upon a detection of a heavy hydrocarbon breakthrough from the adsorption system (e.g., heavy hydrocarbons within the treated feed 9 exceed or meet a pre-selected heavy hydrocarbon concentration threshold for the treated feed 9).

As yet another example of additional steps that can be included in the process of FIG. 3, the process can also include installing an embodiment of the apparatus 1 at a plant to facilitate removal of heavy hydrocarbons from a feed. The apparatus 1 can be installed downstream or upstream of carbon dioxide and sulfur removal units of the plant and can be configured to remove heavy hydrocarbon within a feed obtained from at least one natural gas pipeline, for example. It should be appreciated that such a step can be performed such that an embodiment of the apparatus 1 can be retrofit into a pre-existing plant so the plant can have the apparatus 1 added into it. The step can also be performed so that the apparatus 1 is included in a new plant that is to be constructed.

EXAMPLES

The adsorbent bed(s) for the adsorber(s) of the adsorption system 6 can be sized to meet several different criteria as discussed herein. For instance, one such criteria can be to provide a minimum contact time between the gas passed through the adsorber and adsorbent material to meet ta desired reduction in heavy hydrocarbon vapor content. Bed contact times may range from 10 seconds to 120 seconds or longer, depending on the reduction in heavy hydrocarbon that can be desired.

Another bed sizing criterion for the adsorber(s) can be to provide sufficient cross-sectional area with short enough bed length to help avoid fluidization in the upflow direction (for adsorbers configured for upflow processing).

Yet another criterion for the adsorber(s) can be to provide enough adsorbent material to give sufficient heavy hydrocarbon adsorption capacity to allow operation for a desired time between bed changeouts. Other criteria may also apply in addition to or in replacement of any of the above.

Evaluations of embodiments of apparatus 1 were performed to help analyze the potential benefits some embodiments may provide. Table 1 provides results of these evaluations. As may be seen from the below Table 1, design sizing results that assumed a 500 metric tonne/hr natural gas feed rate as the feed 3, utilization of Pall Seprasol Plus Coalescing filter elements as the coalescing filter elements CFEs and Calgon PCB (10×4) granular activated carbon as the adsorbent material of the adsorber beds were assumed for this design.

The Case 1 situation of Table 1 assumes heavy hydrocarbon removal occurs at a high temperature without pre-chilling. In Cases 2 and 3 of Table 1, it was assumed the feed 3 was cooled to temperatures of 20° C. (Case 2) and 5° C. (Case 3). Cases 2 and 3 provide examples that show benefits that can be obtained from pre chilling the feed 3 as discussed herein, which can allow for much smaller adsorbent material bed sizes and/or less frequent adsorbent material changeout frequency and adsorbent material consumption. This was found to be the case when the adsorbers were configured for upflow operation as well as when the adsorbers were configured for downflow operation.

TABLE 1

Summary of Analysis Results from Cases 1-3

| Case | 1 | 2 | 3 |
|---|---|---|---|
| Temperature (° C.) | 40 | 20 | 5 |
| Pressure (barg) | 70 | 70 | 70 |
| Vapor Phase heavy hydrocarbon concentration (ppmw) | 6.94 | 1.02 | 0.19 |
| Liquid Phase (aerosol) heavy hydrocarbon concentration (ppmw) | 3.56 | 9.48 | 10.31 |
| Coalescer Elements (number of elements) | 38 | 34 | 32 |
| Coalescer Diameter × tan-tan length (inch) | 93 × 168 | 90 × 168 | 88 × 168 |
| Upflow Adsorber Utilization | | | |
| Adsorbent material volume (ft³) | 14,400 | 5,400 | 5,400 |
| Adsorbent material mass (lb) | 335,000 | 125,500 | 125,500 |
| Adsorber Diameter × tan-tan (ft) | 21 × 40.5 | 19 × 19 | 19 × 19 |
| Changeout frequency (months) | 6 | 15.3 | 82.4 |
| Downflow Adsorber Utilization | | | |
| Adsorbent material volume (ft³) | 14,400 | 3,100 | 2,200 |
| Adsorbent material mass (lb) | 335,000 | 72,300 | 50,200 |
| Adsorber Diam × tan-tan (ft) | 21 × 40.5 | 15 × 17.5 | 14 × 14 |
| Changeout frequency (months) | 6 | 8.8 | 32.9 |

As can be appreciated from the above Table 1, the evaluated embodiments of the apparatus and process of the present invention were found to be capable of providing substantial and significant operational improvements. Further, the pre-chilling of the feed was able to help provide a further improvement in decreased absorbent material bed sizing while also providing a significant increase in the time between adsorbent material changeouts.

The above evaluation further confirms that utilization of the coalescing filter device 2 can help provide a more reliable heavy hydrocarbon content for gas fed to an adsorption system 6 for heavy hydrocarbon removal, which can help ensure heavy hydrocarbon breakthrough to downstream processing can be avoided. This can help provide improvements by avoiding downstream plugging or other processing issues that can be caused by heavy hydrocarbon impurities that are unexpectedly in feeds as discussed above.

It should be appreciated that modifications to the embodiments explicitly shown and discussed herein can be made to meet a particular set of design objectives or a particular set of design criteria. For instance, the arrangement of valves, piping, and other conduit elements (e.g., conduit connection mechanisms, tubing, seals, valves, etc.) for interconnecting different units of the apparatus for fluid communication of the flows of fluid between different elements (e.g., pumps, heat exchangers, cooling devices, chillers, compressors, etc.) can be arranged to meet a particular plant layout design that accounts for available area of the plant, sized equipment of the plant, and other design considerations. As another example, the flow rate, pressure, and temperature of the fluid passed through the various apparatus or system elements can vary to account for different design configurations and other design criteria.

Embodiments of the apparatus for treating gas feeds that comprise methane to remove impurities from the feed that can be present in a liquid form, process for treating gas feeds that comprise methane to remove impurities from the feed that can be present in a liquid form, and/or system for treating gas feeds that comprise methane to remove impurities from the feed that can be present in a liquid form can each be configured to include process control elements positioned and configured to monitor and control operations (e.g., temperature and pressure sensors, flow sensors, an automated process control system having at least one work station that includes a processor, non-transitory memory and at least one transceiver for communications with the sensor elements, valves, and controllers for providing a user interface for an automated process control system that may be run at the work station and/or another computer device of the plant, etc.). It should be appreciated that embodiments can utilize a distributed control system (DCS) for implementation of one or more processes and/or controlling operations of an apparatus as well.

As another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of the process, apparatus, system and methods of making and using the same have been shown and described above, it is to be distinctly understood that the invention is not limited thereto but may be otherwise variously embodied and practiced within the scope of the following claims.

What is claimed is:

1. An apparatus for removal of heavy hydrocarbon impurities from a feed comprising methane gas, the apparatus comprising:
   a coalescing filter device having at least one coalescing filter that has a plurality of coalescing filter elements to remove liquid heavy hydrocarbons from within the feed, the liquid heavy hydrocarbons separated from the feed being outputtable from the coalescing filter device;
   a cooling device positioned upstream of the coalescing filter device to cool the feed to a pre-selected coalescing filter device feed temperature before the feed is fed to the coalescing filter device; and
   an adsorption system positioned downstream of the coalescing filter device to receive a coalescing filter device treated feed output flow output from the coalescing filter device, the adsorption system comprising a first adsorber, the first adsorber having a first bed of adsorbent material within a first vessel of the first adsorber, the first adsorber positioned to receive the coalescing filter device treated feed output flow output from the coalescing filter device so that the coalescing filter device treated feed output flow output from the coalescing filter device is passed through the first adsorber to contact the adsorbent material of the first bed of adsorbent material for removal of heavy hydrocarbons to output a treated feed gas.

2. The apparatus of claim 1, wherein the heavy hydrocarbons are hydrocarbons that have 10 or more carbon atoms or include at least one compressor lubricant oil.

3. The apparatus of claim 1, wherein the pre-selected coalescing filter device feed temperature is a temperature that is between 5° C. and −10° C.

4. The apparatus of claim 1, wherein the pre-selected coalescing filter device feed temperature is a temperature that is between 25° C. and −20° C., a temperature that is between 5° C. and −10° C. or a temperature that is between 0° C. and −10° C.

5. The apparatus of claim 1, comprising:
   a heat exchanger positioned downstream of the adsorption system to cool the treated feed gas outputtable from the adsorption system to output a cooled treated feed gas, wherein the cooling device positioned upstream of the coalescing filter device is configured to receive the cooled treated feed gas from the heat exchanger to cool the feed to the pre-selected coalescing filter device feed temperature before the feed is fed to the coalescing filter device.

6. The apparatus of claim 1, comprising:
a heat exchanger positioned downstream of the adsorption system to cool the treated feed gas outputtable from the adsorption system.

7. The apparatus of claim 1, comprising:
a heat exchanger positioned downstream of the adsorption system to cool the treated feed gas outputtable from the adsorption system to a temperature within a pre-selected liquefaction device feed temperature range or a pre-selected cryogenic processing feed temperature range for cryogenic processing at a temperature that is at or below −40° C.

8. The apparatus of claim 1, wherein:
the cooling device comprises a turbine or a valve.

9. The apparatus of claim 1, wherein:
the cooling device comprises a gas expander natural gas liquid (NGL) recovery unit or a natural gas liquefaction unit.

10. The apparatus of claim 1, wherein the feed has a water content of less than 2 ppmw water and is at least 70 volume percent methane.

11. The apparatus of claim 1, wherein the feed is providable via at least one natural gas pipeline.

12. A process for removal of heavy hydrocarbons from a feed comprising methane, the process comprising:
cooling the feed to a pre-selected coalescing filter device feed temperature before the feed is fed to a coalescing filter device;
separating liquid heavy hydrocarbons from the feed cooled to the pre-selected coalescing filter device feed temperature via the coalescing filter device to output a coalescing filter device treated feed output flow; and
passing the coalescing filter device treated feed output flow through at least one bed of adsorbent material of at least one adsorber of an adsorption system for outputting a treated feed gas.

13. The process of claim 12, wherein the adsorbent material comprises activated carbon and the feed also has a water content of less than 2 ppmw water.

14. The process of claim 12, wherein:
the pre-selected coalescing filter device feed temperature is being a temperature that is between 25° C. and −20° C., a temperature that is between 5° C. and −10° C. or a temperature that is between 0° C. and −10° C.

15. The process of claim 12 comprising:
cooling the treated feed gas output from the adsorption system to output a cooled treated feed gas; and
feeding the cooled treated feed gas to the cooling device to provide a cooling medium for the cooling of the feed to the pre-selected coalescing filter device feed temperature.

16. The process of claim 12, comprising:
cooling the treated feed gas output from the adsorption system.

17. The process of claim 16, wherein the cooling of the treated feed gas is provided via a chiller or a heat exchanger.

18. The process of claim 12, comprising:
feeding the treated feed gas output from the adsorption system to a liquefaction device for liquefaction to form a liquid natural gas (LNG) product or a cryogenic processing device for processing the treated feed gas at a temperature that is less than or equal to −40° C.

19. The process of claim 12, comprising:
the pre-selected coalescing filter device feed temperature being a temperature that is between 25° C. and −20° C.; and
cooling the treated feed gas output from the adsorption system to a temperature within a pre-selected liquefaction device feed temperature range or a pre-selected cryogenic processing feed temperature range for cryogenic processing at a temperature that is less than or equal to −40° C.

20. An apparatus for removal of heavy hydrocarbon impurities from a feed comprising methane gas, the apparatus comprising:
a coalescing filter device positionable to receive the feed, the coalescing filter device having at least one coalescing filter that has a plurality of coalescing filter elements to remove liquid heavy hydrocarbons from within the feed, the liquid heavy hydrocarbons separatable from the feed being outputtable from the coalescing filter device;
a cooling device positionable upstream of the coalescing filter device to cool the feed to a pre-selected coalescing filter device feed temperature before the feed is fed to the coalescing filter device; and
the coalescing filter device connectable to an adsorption system positioned downstream of the coalescing filter device to feed a coalescing filter device treated feed output flow output from the coalescing filter device to the adsorption system so that the coalescing filter device treated feed output flow output from the coalescing filter device is passable through at least one first adsorber of the adsorption system to contact adsorbent material of a first bed of adsorbent material for removal of heavy hydrocarbons to output a treated feed gas.

* * * * *